(12) United States Patent
Robeson et al.

(10) Patent No.: US 12,548,454 B2
(45) Date of Patent: Feb. 10, 2026

(54) CONTROLLING DRONE NOISE BASED UPON HEIGHT

(71) Applicant: International Business Machines Corporation, Armonk, NY (US)

(72) Inventors: Kyle D. Robeson, North York (CA); Steve Mcduff, Unionville (CA); Anthony Di Loreto, Markham (CA); Ben Z. Akselrod, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 18/188,500

(22) Filed: Mar. 23, 2023

(65) Prior Publication Data

US 2024/0321116 A1 Sep. 26, 2024

(51) Int. Cl.
*G08G 5/30* (2025.01)
*G08G 5/55* (2025.01)
*G08G 5/59* (2025.01)

(52) U.S. Cl.
CPC ............... *G08G 5/30* (2025.01); *G08G 5/55* (2025.01); *G08G 5/59* (2025.01)

(58) Field of Classification Search
CPC .. G08G 5/30; G08G 5/55; G08G 5/59; H10H 29/922; H10F 77/1692; H10D 30/797; H10D 84/972; H10D 84/0126; A23B 40/60
See application file for complete search history.

(56) References Cited

U.S. PATENT DOCUMENTS

| | | | |
|---|---|---|---|
| 9,442,496 B1* | 9/2016 | Beckman | G10K 11/17857 |
| 11,403,957 B2* | 8/2022 | Beaurepaire | G08G 5/32 |
| 2019/0189016 A1 | 6/2019 | Kubie | |
| 2019/0340933 A1* | 11/2019 | Villa | G08G 5/0026 |
| 2021/0012669 A1 | 1/2021 | Beaurepaire | |
| 2022/0397917 A1* | 12/2022 | Arksey | H04B 17/27 |

FOREIGN PATENT DOCUMENTS

EP 3944217 A1 * 1/2022 ............. B64D 43/00

OTHER PUBLICATIONS

Anonymous, "City Noise Mapping", DataKustik, downloaded from the Internet on Sep. 27, 2022, 5 pages, <https://www.datakustik.com/noise-outdoors/city-noise-mapping/>.

(Continued)

*Primary Examiner* — Rachid Bendidi
*Assistant Examiner* — Joseph Anderson Yanoska
(74) *Attorney, Agent, or Firm* — Kimberly Zillig (57) ABSTRACT

A computer-implemented system and related method manage noise from a drone. This method comprises generating a flight path for the drone from an origin to a destination and determining a path segment ground noise level for each segment that makes up the flight path within each ground level noise zone (GLNZ). A minimum altitude is determined for each path segment that is based on the determined path segment ground noise level within each GLNZ. The drone height/altitude above ground is controlled to be at or above the determined minimum altitude as it traverses the path segments of the path within each GLNZ.

20 Claims, 4 Drawing Sheets

(56) References Cited

OTHER PUBLICATIONS

Authors et al.: Disclosed Anonymously, "Method and System for Drone Route Selection and Altitude Based on Payload", An IP.com Prior Art Database Technical Disclosure, IP.com No. IPCOM000243699D, IP.com Electronic Publication Date: Oct. 13, 2015, 4 pages.

Duporge et al., "Determination of optimal flight altitude to minimise acoustic drone disturbance to wildlife using species audiograms", Methods in Ecology and Evolution, 2021, 12 pages.

Kennedy et al., "Modelling and mitigation of drone noise", Vibroengineering Procedia, May 2021, vol. 37, pp. 60-65, DOI https://doi.org/10.21595/vp.2021.21988.

Paine, Garth, "Have You Heard the Buzz About Delivery Drones' Noise?", Slate, May 6, 2019, 5 pages, <https://slate.com/technology/2019/05/delivery-drones-amazon-google-noise-buzzing.html>.

Scozzaro et al., "Noise Abatement Trajectories for a UAV Delivery Fleet", SID 2019, 9th SESAR Innovation Days, Dec. 2019, Athenes, Greece, 9 pages.

\* cited by examiner

CONTROLLING DRONE NOISE BASED UPON HEIGHT

BACKGROUND

Disclosed herein is a system and related method for drone operation. In particular, the system and method disclosed herein control drone noise based on its height.

Drones are becoming more and more prevalent in society. They are being used for delivering products, monitoring weather and traffic, providing new perspectives on sale properties, inspecting formerly unreachable places, and in many other ways. One negative issue with drones, however, is the noise they produce, and the harm to the quality of living for those in the vicinity of the drone that this noise may create.

SUMMARY

Disclosed herein is a computer-implemented method for managing noise from a drone. This method comprises generating a flight path for the drone from an origin to a destination and determining a path segment ground noise level for each segment that makes up the flight path within each ground level noise zone (GLNZ). A minimum altitude is determined for each path segment that is based on the determined path segment ground noise level within each GLNZ of a plurality of GLNZs. The drone height/altitude above ground is controlled to be at or above the determined minimum altitude as it traverses the path segments of the path within each GLNZ.

Disclosed herein is also a system for managing noise from a drone, comprising a memory, and a processor. The processor executes software stored in a computer media and is configured to generate a flight path for the drone from an origin to a destination. The processor also determines a path segment ground noise level for each segment that makes up the flight path within each ground level noise zone (GLNZ). The processor also determines a minimum altitude for each path segment that is based on the determined path segment ground noise level within each GLNZ. The processor further controls an altitude above the ground of the drone to be at or above the determined minimum altitude as it traverses the path segments of the path within each GLNZ.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general acronyms may be used below:
CD-ROM compact disc ROM
CPP computer program product
DVD digital versatile disk
EPROM erasable programmable read-only memory
EUD end-user device
IoT Internet of Things
LAN local-area network
NFC near field communication
RAM random access memory
ROM read-only memory
SAN storage area network
SD secure digital
SDN software-defined networking
SRAM static random-access memory
UI user interface
USB universal serial bus
VCE virtual computing environment
WAN wide-area network Table 1

General Acronyms

Data Processing System in General

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
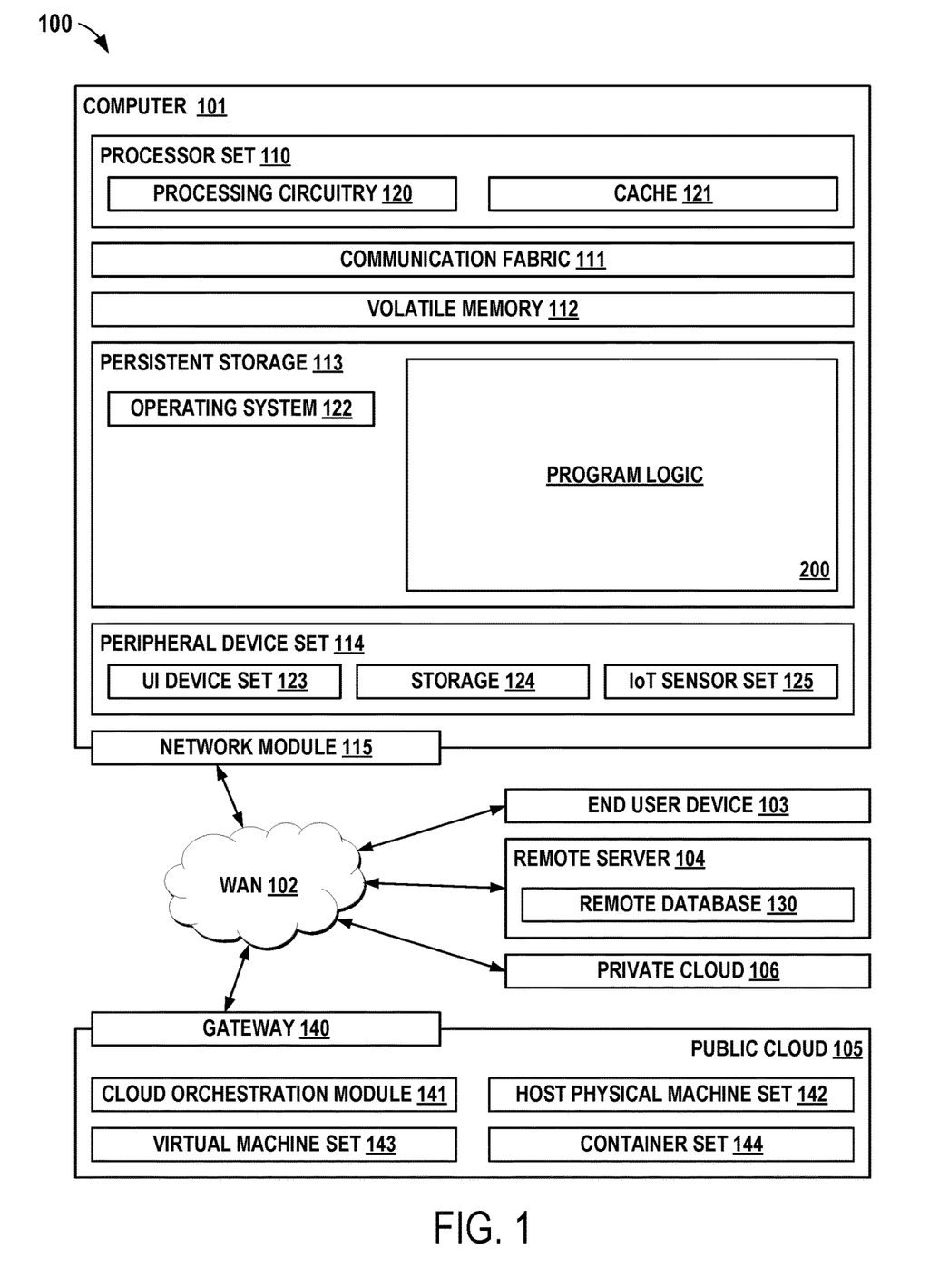
FIG. 1 is a block diagram of a general computing device and environment.

FIG. 1 is a block diagram of a general computing device and environment. Computing environment 100 contains an example of an environment for the execution of at least some of the computer code involved in performing the inventive methods, such as [Fill in this space with the name of the inventive code block. This description should reveal to the reader what the inventive code does at a general level. Illustrative examples: "improved cloud orchestration code," "new ML algorithm code," etc.] 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Controlling Drone Noise Based Upon Height/Altitude Above Ground

Drones are becoming more and more prevalent in society. There are many use cases around delivery, weather, traffic, inspection, presentation, etc., that will become popular in the upcoming years. One issue, however, with the use of drones is that they can be quite loud—the amount of noise may be based on a size and operating characteristics of a particular drone. Many individuals find that a drone buzz is annoying, particularly if they frequently hear it. Fortunately, as the distance between drones and people increases, the perceived level of noise by individuals decreases. When a particular drone is far enough away from an individual, the perceived noise level may drop below a street-level or ambient noise and no longer pose a noise problem for the individual. The term "perceived noise level", as used herein, will make reference to a noise level as perceived by a particular individual listener at a location relative to the drone. This would be a noise level measured (e.g., 60 dB) if a sound meter were to be held at the listener's ear. It will vary based on a distance between the drone and the user along with other factors. The term "absolute noise level", as used herein, will make reference to a noise level in the immediate proximity of the drone, or at some arbitrary standardized distance (such as one foot at a front location) from the drone. The term "annoyance level", as used herein, will make reference to a noise level and its particular characteristics, such as frequency, etc., that a user experiences. Although the "annoyance level" may not have a precisely measurable value, as do the absolute noise level and the perceived noise level, some broad forms of measurement based on listener feedback may be established, such as a 0-5 scale or the like.

However, the noise problem is complex. There is a significant amount of variation in the absolute level of noise produced by drones. As a general rule, larger drones will produce a higher absolute noise level than smaller ones. For a given drone, operating the engine(s) or motors(s) at a higher speed will generally produce a higher absolute noise level. The orientation of the drone relative to the listener may impact the perceived noise level. Furthermore, there may be certain sound frequencies produced by a drone that are more annoying than others. For example, a higher-pitched sound at a given perceived noise level may have a higher annoyance level than a lower-pitched sound at the same perceived noise level.

Advantageously, by determining various actions for a drone to take, the absolute noise level, the perceived noise level, and the annoyance level may all be reduced, thereby creating a better sound environment for listeners in the general area of the drone(s).

This disclosure proposes a system and a method that accounts for street level noise for a drone's particular flight path. In some embodiments, this may be done in real time, and in some embodiments, this may be based on noise maps of a particular city or region.

Figure 2:
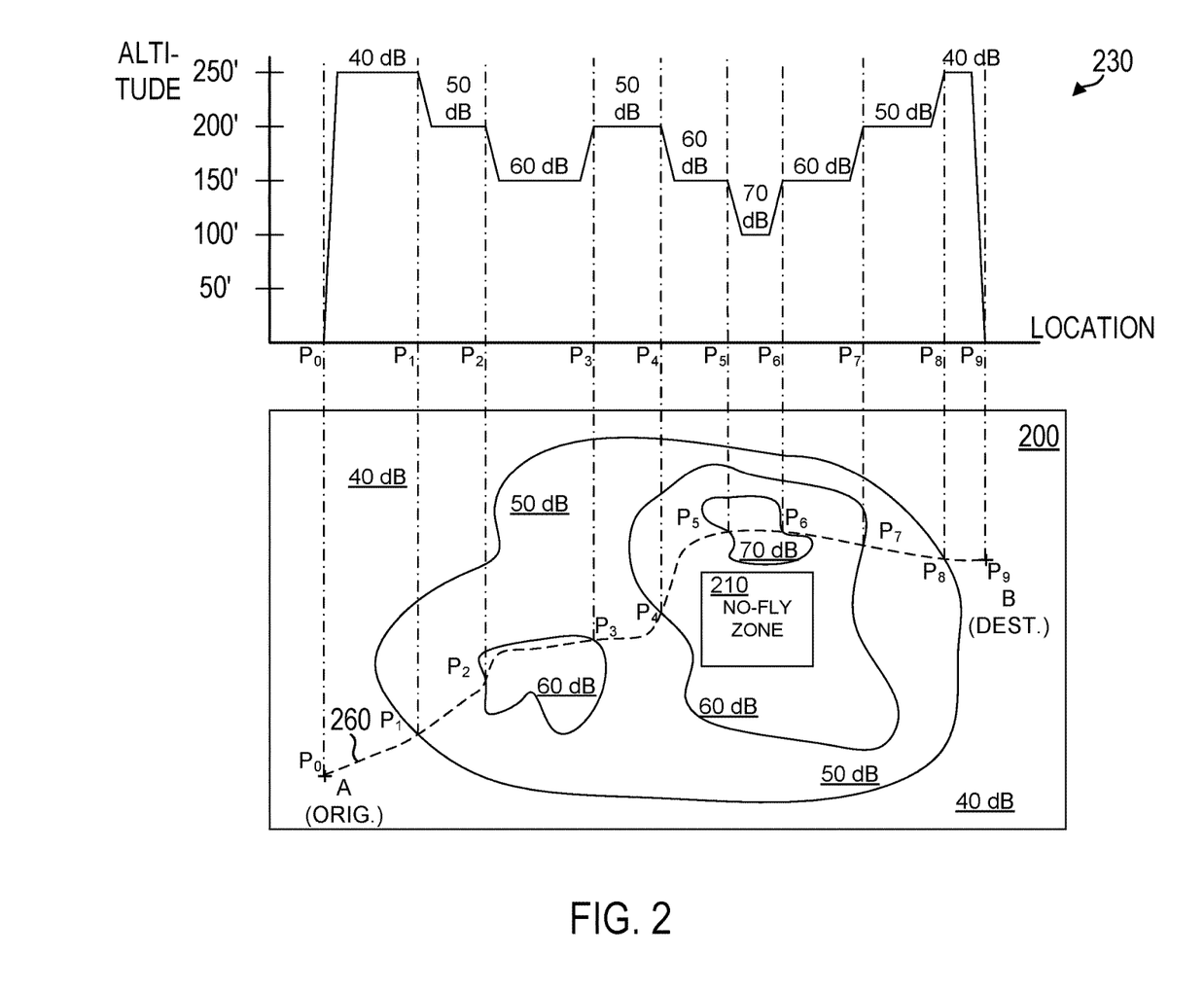
FIG. 2 is a combined drone map and altitude graph that illustrates various features of disclosed embodiments.

FIG. 2 is a combined map 200 and altitude chart 230 that shows an example flight path 260 of a drone 305 (FIG. 3) in flying from an origin point A P0 to a destination point B P9. FIG. 2 will be discussed in conjunction with FIG. 3, which is a block diagram of an example system 300 in which a drone 305 operates.

Figure 3:
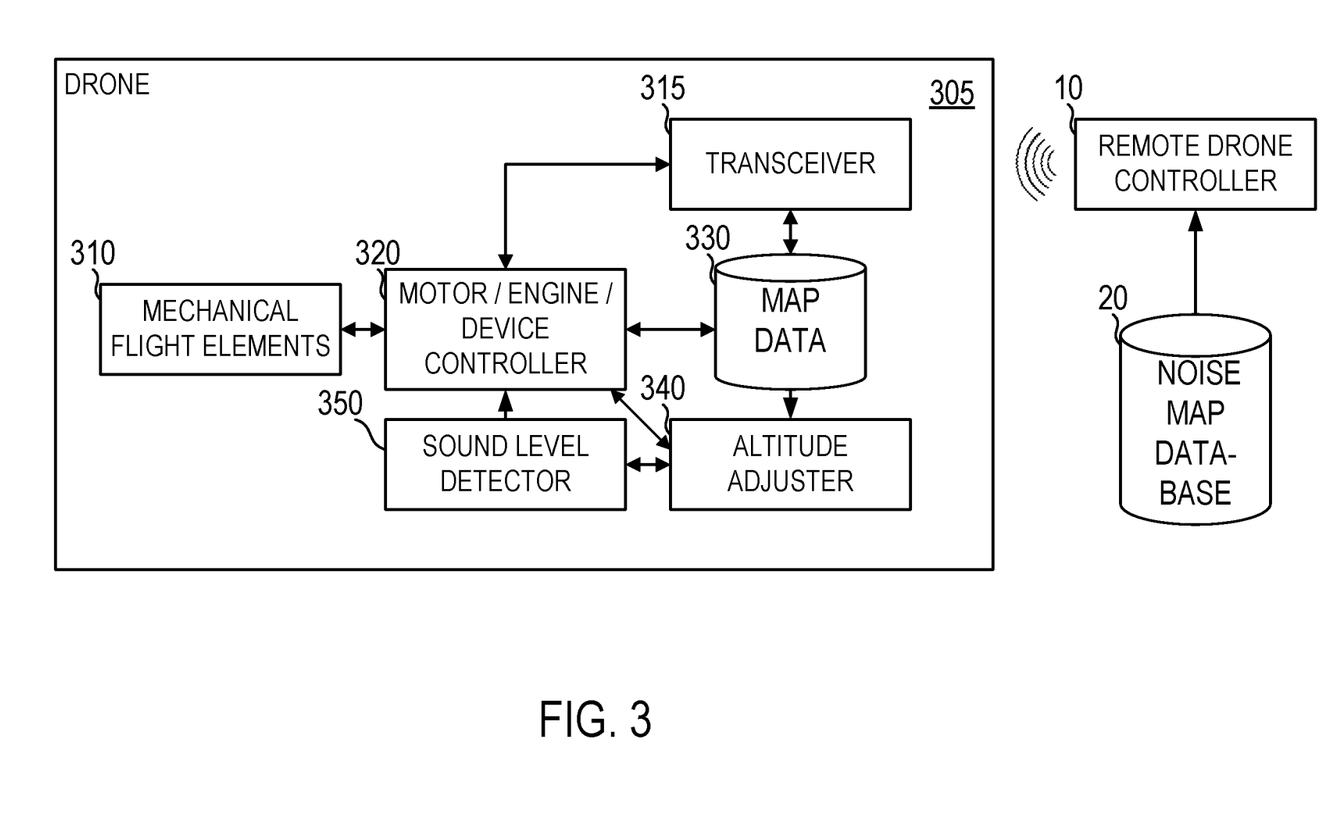
FIG. 3 is a block diagram that illustrates primary components of a system including a drone, according to various embodiments of the disclosure.

The map 200 shows several regions that each encompass various ground-level noise zones (GLNZs). Shown on the map are bounded GLNZs ranging from 50 dB to 70 dB, with anything outside of these GLNZs being designated as 40 dB. These GLNZs represent an average level of ground noise that is present. This map 200 may be dynamic, and may change based on a variety of factors, such as time of day, day of week, day of year, weather, etc. Map data may be stored in a noise map database 20, and may be provided to the drone 305 via a remote drone controller 10 that may communicate wirelessly with the drone 305 via a transceiver 315 and may be used to control the drone 305. The remote drone controller 10 may communicate wirelessly with the drone 305, and relevant noise map data may be communicated prior to flight.

In some embodiments, the relevant noise map data from the database 20 may be provided to the drone in real-time, depending on a location, such as a GPS-determined location of the drone 305. In some embodiments, only periodic updates to the map are provided by the remote drone controller 10. The drone 305 may also communicate information that it senses with a sound level detector 350 back to the remote drone controller 10 so that the noise map database 20 may be updated with a current situation and to store data for historical purposes. A processor (not shown in the drawings) may be used to provide machine learning operations related to noise level situations stored in the database 20.

In many instances, the drone 305 will not be at ground level, and thus, the ground level noise may be estimated based on the actual measured sound level that was measured with the sound level detector 350 and the height of the drone 305 when the sound level measurement was made.

As shown in FIG. 2, the drone 305 has a flight path 260 from its origin point A $P_0$ to its destination point B $P_9$, but its path 260, which is broken down into multiple path segments (e.g., a first segment from $P_0$ to $P_1$, a second segment from $P_1$ to $P_2$, etc.) takes the drone 305 through several different GLNZs. The flight path points may be considered, e.g., as made up of latitude and longitude values, and the flight path segments may correspond to the latitude and longitude values associated with the path segment. The flight path 260 may be determined on a number of factors. Obviously, the origin point A $P_0$ and destination point B $P_9$ are the most important factors, but there may be obstacles that require something beyond a "shortest-distance straight-line" path. For example, FIG. 2 shows the presence of a no-fly zone 210 that prevents a straight-line path to be used. Obstacles, such as buildings, trees, and any other unrelated factors might dictate a particular path 260.

As indicated in FIG. 2, the flight path 260 enters and exits different GLNZs at different points $P_1 \ldots P_8$, in different path segments. Each of these GLNZs representing different ground noise levels, has a certain drone-dependent altitude restriction above which height the drone 305 noise will be acceptable for the given ground level noise. By way of illustration only, the altitude graph in FIG. 2 indicates that for a 40 dB GLNZ, a 250' altitude is the minimum height at which a particular drone 305 may fly and create a ground-level noise that is acceptable for the particular GLNZ. Similarly, a minimum altitude of 200' is provided when flying over a 50 dB GLNZ, a minimum altitude of 150' is provided when flying over a 60 dB GLNZ, and a minimum altitude of 100' is provided when flying over a 70 dB GLNZ.

As shown in FIG. 2, when the drone 305 takes off in the relatively low-noise GLNZ at $P_0$, it attempts to reach the minimum altitude of 250' as quickly as possible. However, once it crosses the boundary of the 50 dB GLNZ at P1, it is acceptable for the drone 305 to drop down to 200', if there is some benefit to doing so. The various altitudes illustrated in the altitude graph of FIG. 2 represent minimum values that the drone 305 should attempt to fly at. However, there may be reasons why one may not always wish to fly the drone at its lowest acceptable altitude. For example, there may be fuel considerations to take into account that might suggest remaining at the highest minimum altitude for a given path 260 to conserve fuel without repeated climbs.

The drone 305 position and speed may be controlled by mechanical flight elements 310, such as propellers and flight control surfaces, and these may be controlled by a motor/engine/device controller 320. The altitude adjuster 340 may interact with the controller 320 and read the map data 330 on the drone 305 to ensure a proper altitude is maintained.

The path 260 continues to P2, crossing into a 60 dB GLNZ, to P3 crossing back into the 50 dB GLNZ, to P4 crossing into another 60 dB GLNZ, to P5 crossing into a 70 dB GLNZ, to P6 crossing back into the 60 dB GLNZ, to P7 crossing back into the 50 dB GLNZ, to P8, crossing back into the 40 dB GLNZ. Again, the crossings may require or may allow for an altitude change, depending on whether the drone 305 is transitioning from a more sound restrictive zone into a less sound restrictive zone or vice versa. Various laws and ordinances at a local, state, and/or national level may be taken into account in determining a proper height for a given drone 305 with specific ground noise levels. The noise level and sound characteristics, such as frequency, produced by a particular drone 305 at various levels of engine speed may be determined and used in the calculation to determine a required altitude for the drone 305 under various conditions. Although the ground noise levels illustrated in this example are quantized into 10 dB tiers, any quantization level (5 dB, 20 dB) may be used, consistent with various embodiments disclosed herein.

As can be seen in the altitude graph, an ascent of the drone 305 into a lower ground noise (i.e., quieter) GLNZ preferably begins in advance of entering the GLNZ so that the drone 305 is at a proper altitude upon entering that GLNZ. Conversely, a descent of the drone 305 into a higher ground noise GLNZ may begin at any time after crossing into that GLNZ. Relevant ascent and descent rates for the particular drone 305 as well as fuel consumption rates, etc., may be factored in when preparing the path 260.

As noted above, the GLNZ map 200 may be statically provided to the drone 305, or may be dynamically updated, based on predefined changes in ground conditions. However, it may also be possible that a proper altitude may be maintained based on a sound detected by the sound level detector 350. The sound level detector 350 may, in some embodiments, be a sensor, such as a microphone, located on the drone. In this embodiment, the sound level detector 350 may measure a current level of sound and, based on an altitude of the drone 305, estimate the ground level noise and adapt the drone's altitude accordingly. A sound level detector 350 may use a directional microphone and/or filtering to remove some of the noise made by the drone itself or to amplify certain ground noise (e.g., amplify sounds at particular frequencies) so that the ground noise may be more accurately measured.

In other embodiments, the sound level detector 350 may be located on the ground, and information about the noise level it is picking up in a zone in which the drone 305 is flying may be relayed to the remote drone controller 10 by the sound level detector 350, and then, by the remote drone controller 10, to the drone so that its map data 330 may be updated.

For example, the drone 305 may be flying over a 50 dB GLNZ, but the sound level detector estimates, taking into account its height at 200', that the ground level noise is actually at 60 dB, which would permit, using the altitude adjuster 340, the drone 305 to drop to a lower 150' level. If the sound level detector determines that the ground noise level has then dropped to an estimated 50 dB, the altitude adjuster 340 may then reinstate a 200' height level based on the changed detected noise level. In some embodiments, the dynamic use of the sound level detector 350 may be the sole determining factor of the drone's 305 altitude, whereas in other embodiments, the sound level detector may serve only to supplement the map data 330 of the drone's 305 path 260.

In some embodiments, the drone 305 altitude may be based on a determination of a net zero noise level, i.e., where the noise of the drone 305 is exactly canceled out by the ground noise level (i.e., equal to the ground noise level at a ground level beneath the drone 305). In some embodiments, the drone 305 altitude may be based on some predetermined minimum level of acceptable drone noise above the ground level. For example, it may be determined that it is acceptable for the noise from the drone 305 to exceed the ground level noise by no greater than a 5 dB maximum, and the altitude determinations may be based on that threshold.

The sound level detector 350 may be designed to filter out as much of the drone's 305 own noise in order to better determine an estimated ground level noise. In some embodiments, various frequency filters or filters that are particular to sound characteristics of the drone 305 may be used. In some embodiments, a sound level detector (not shown) that is not part of the drone, but that actually measures the ground level noise may be measured and conveyed to the map data 330 of the drone.

In some embodiments, the actual path 260 of the drone may be based on characteristics of the GLNZs. By way of example, if fuel or time savings could result by a lower-altitude overall path, then the drone's path 260 may be calculated to favor noisier GLNZs. For example, the drone 305 path 260 may favor traveling along highways, which tend to be noisier due to vehicle traffic. An optimal path 260 may further take into account battery life and total distance flown. By way of another example, if there is a straight-line path 260 where the drone 305 must fly at a high altitude, a different path may be more beneficial that saves the drone 305 from having to climb to a higher level—this may potentially result in the drone's 305 overall flight time and path shorter.

Figure 4:
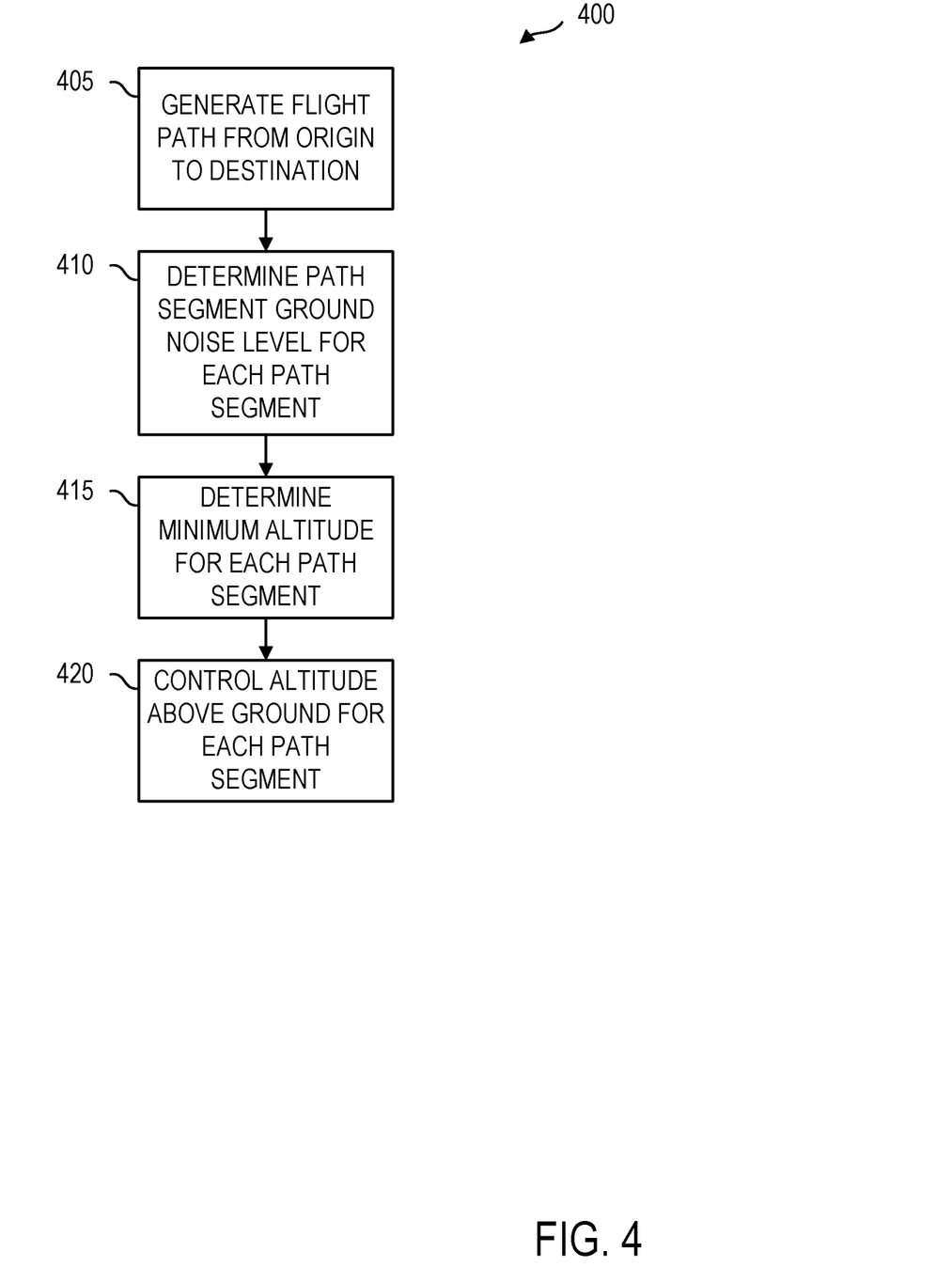
FIG. 4 is a flowchart that illustrates an example process for operating a drone, according to various embodiments.

FIG. 4 is a flowchart that illustrates a process 400 for minimizing drone noise. In operation 405, a flight path 260 is generated for the drone 305 from an origin point A $P_0$ to a destination point B $P_9$. The flight path 260 may be broken up into flight path segments that are each bounded by a respective GLNZ.

In operation 410, a ground level noise is determined for each GLNZ (corresponding to a flight path segment), and in operation 415, a minimum altitude at which the drone 305 may operate is determined based on the round level noise for the GLNZ and a noise level of the drone 305. This minimum altitude may be determined based on the goal, in some embodiments, of a zero-level addition of noise by the drone 305 over the ground level noise. That is, the noise introduced by the drone 305 at ground level is completely washed out by the actual noise level at the ground. However, in some embodiments, some small threshold of detectable noise by the drone 305 at the ground level may be tolerated, and thus, this may be a factor when determining the minimum altitude of the drone 305.

In operation 420, the altitude of the drone 305 within a GLNZ may be modified by an altitude adjuster that operates with the motor/engine/controller 320 to bring the drone 305 at or above the determined minimum altitude.

Technical Application

The one or more embodiments disclosed herein accordingly provide an improvement to drone operation technology, namely to an improvement to the reduction of perceived noise when operating a drone.

What is claimed is:

1. A computer-implemented method for managing noise from a drone, the computer-implemented method comprising:
    generating a flight path for the drone from an origin to a destination;
    determining a path segment ground noise level for each path segment that makes up the flight path within each ground level noise zone (GLNZ);
    determining a minimum altitude for each of the path segments that is based on the determined path segment ground noise level within each of the GLNZs and based on laws and ordinances relating to the minimum altitude for the drone that apply within each of the path segments;
    controlling an altitude above a ground of the drone to be at or above the determined minimum altitude as it traverses each of the path segments of the flight path within each of the GLNZs;
    modifying the flight path to an optimal path based on a battery life of the drone and a total distance flown by the drone; and
    controlling the drone based on the modified flight path.

2. The computer-implemented method of claim 1, wherein the determining of the path segment ground noise level comprises measuring a ground noise level while the drone is flying in each of the path segments.

3. The computer-implemented method of claim 2, wherein the measuring of the ground noise level is performed by a sensor located at ground level within each of the GLNZs in which the drone is operating.

4. The computer-implemented method of claim 2, wherein the measuring of the ground noise level is performed by a sensor on the drone.

5. The computer-implemented method of claim 4, wherein the measuring of the ground noise level utilizes a current drone altitude above ground level.

6. The computer-implemented method of claim 1, further comprising: creating a map that comprises the flight path and each of the GLNZs that the flight path traverses; and loading the map into a map data memory of the drone.

7. The computer-implemented method of claim 6, further comprising updating the map during the drone's execution of the flight path.

8. The computer-implemented method of claim 7, wherein the updating of the map is done according to a predefined period.

9. The computer-implemented method of claim 7, wherein the updating of the map is done in real-time based on a locating of the drone within a particular GLNZ.

10. The computer-implemented method of claim 7, wherein the updating of the map is based on a detected sound level in real-time.

11. The computer-implemented method of claim 6, wherein controlling the altitude comprises: beginning an ascent to a new determined altitude for a new GLNZ that is quieter than a current GLNZ prior to entering the new GLNZ.

12. The computer-implemented method of claim 1, wherein controlling the altitude is further based on a level of a current noise of the drone.

13. The computer-implemented method of claim 12, wherein controlling the altitude is further based on frequency components of the current noise of the drone.

14. The computer-implemented method of claim 1, wherein the determining of the minimum altitude is determined based on producing a ground level noise of the drone that is equal to the ground noise level at ground level under the drone.

15. The computer-implemented method of claim 1, wherein the determining of the minimum altitude is determined based on producing a ground level noise of the drone that is greater, by a predefined maximum threshold, than the ground level noise at ground level under the drone.

16. The computer-implemented method of claim 1, wherein the generating of the flight path uses GLNZ information for determining latitude and longitude components of each of the path segments.

17. The computer-implemented method of claim 16, wherein the generating of the flight path is done to minimize a maximum altitude of the flight path.

18. A system for managing noise from a drone, comprising:
    a memory; and
    a processor that is configured to:
        generate a flight path for the drone from an origin to a destination;
        determine a path segment ground noise level for each path segment that makes up the flight path within each ground level noise zone (GLNZ);
        determine a minimum altitude for each of the path segments that is based on the determined path segment ground noise level within each of the GLNZs and based on laws and ordinances relating to the minimum altitude for the drone that apply within each of the path segments;
        control an altitude above a ground of the drone to be at or above the determined minimum altitude as it traverses each of the path segments of the flight path within each of the GLNZs;

modify the flight path to an optimal path based on a battery life of the drone and a total distance flown by the drone; and control the drone based on the modified flight path.

19. The system of claim 18, wherein the processor is further configured to: create a map that comprises the flight path and each of the GLNZs that the flight path traverses; and load the map into a map data memory of the drone.

20. A computer program product for managing noise from a drone, the computer program product comprising:

one or more computer readable storage media, and program instructions collectively stored on the one or more computer readable storage media, the program instructions comprising program instructions to:

generate a flight path for the drone from an origin to a destination;

determine a path segment ground noise level for each path segment that makes up the flight path within each ground level noise zone (GLNZ);

determine a minimum altitude for each of the path segments that is based on the determined path segment ground noise level within each of the GLNZs and based on laws and ordinances relating to the minimum altitude for the drone that apply within each of the path segments;

control an altitude above a ground of the drone to be at or above the determined minimum altitude as it traverses each of the path segments of the flight path within each of the GLNZs;

modify the flight path to an optimal path based on a battery life of the drone and a total distance flown by the drone; and control the drone based on the modified flight path.

* * * * *